United States Patent
Melikyan et al.

(10) Patent No.: US 10,983,276 B2
(45) Date of Patent: Apr. 20, 2021

(54) BIREFRINGENT WAVEGUIDE CIRCUIT HAVING AN OPTICAL HYBRID

(71) Applicant: Nokia Solutions and Networks OY, Espoo (FI)

(72) Inventors: Argishti Melikyan, Matawan, NJ (US); Po Dong, Morganville, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 19 days.

(21) Appl. No.: 15/604,817

(22) Filed: May 25, 2017

(65) Prior Publication Data
US 2018/0341062 A1    Nov. 29, 2018

(51) Int. Cl.
G02B 6/00 (2006.01)
G02B 6/42 (2006.01)
G02B 6/26 (2006.01)
G02B 6/10 (2006.01)
G02B 6/126 (2006.01)
G02B 6/125 (2006.01)
(Continued)

(52) U.S. Cl.
CPC ............. *G02B 6/126* (2013.01); *G02B 6/125* (2013.01); *G02B 6/2726* (2013.01); *G02B 6/2773* (2013.01); *G02B 2006/12121* (2013.01)

(58) Field of Classification Search
CPC ...... G02B 6/126; G02B 6/125; G02B 6/2726; G02B 6/2773; G02B 6/2793
USPC ... 385/1, 11, 27, 31, 32, 37, 39, 46, 50, 129
See application file for complete search history.

(56) References Cited

U.S. PATENT DOCUMENTS

| 6,917,031 B1 | 7/2005 | Sun et al. |
| 7,724,991 B1 | 5/2010 | Doerr |
| 8,275,224 B2 | 9/2012 | Doerr |

(Continued)

FOREIGN PATENT DOCUMENTS

WO    2017030532 A1    2/2017

OTHER PUBLICATIONS

Guha, Biswajeet et al., "Minimizing temperature sensitivity of silicon Mach-Zehnder interferometers," Optics Express, 2010, vol. 18, Issue 3, pp. 1879-1887.

(Continued)

*Primary Examiner* — Thomas A Hollweg
*Assistant Examiner* — Hung Q Lam
(74) *Attorney, Agent, or Firm* — Mendelsohn Dunleavy, P.C.; Yuri Gruzdkov (57) ABSTRACT

An optical device that can be used as an optical hybrid, e.g., in CMOS-compatible PICs. In an example embodiment, the optical device has a single optical input and four optical outputs. The two optical input signals to be mixed in the optical device are applied to the single optical input as transverse electric (TE) and transverse magnetic (TM) polarization components, respectively, of the corresponding polarization-multiplexed optical input signal. In response to the latter, the optical device causes the four outputs to receive four different relative-phase combinations of the two optical input signals, each combination being coupled into a TE waveguide mode at the respective optical output. A PIC having one or more instances of the optical device can be used, e.g., to implement a coherent optical receiver, wherein the TE and TM polarization components of the optical input signal are populated by a communication signal and a local-oscillator signal.

23 Claims, 5 Drawing Sheets

(51) Int. Cl.
 *G02B 6/27* (2006.01)
 *G02B 6/12* (2006.01)

(56) References Cited

U.S. PATENT DOCUMENTS

| | | | |
|---|---|---|---|
| 8,401,351 B2 * | 3/2013 | Inoue | G02B 6/125 |
| | | | 359/325 |
| 8,588,560 B2 | 11/2013 | Sakamaki et al. | |
| 8,861,902 B2 | 10/2014 | Bontempi et al. | |
| 2015/0139667 A1 * | 5/2015 | Takeuchi | G02F 1/0147 |
| | | | 398/214 |
| 2016/0246005 A1 * | 8/2016 | Liu | G01J 3/0218 |
| 2016/0337727 A1 | 11/2016 | Graves et al. | |

OTHER PUBLICATIONS

Jeong, Seok-Hwan et al., "Compact optical 90° hybrid employing a tapered 2×4 MMI coupler serially connected by a 2×2 MMI coupler," Optics Express, 2010, vol. 18, No. 5, pp. 4275-4288.

Nasu, Yusuke et al., "Temperature insensitive and ultra wideband silica-based dual polarization optical hybrid for coherent receiver with highly symmetrical interferometer design," Optical Society of America, Optics Express, 2011, vol. 19, No. 26, pp. 112-118.

Ma, Yangjin, et al., "Symmetrical polarization splitter/rotator design and application in a polarization insensitive WDM receiver," Optics Express, 2015, vol. 23, No. 12, pp. 16052-16062.

Dong, Po, "Photonic Integrated Circuit Having a Relative Polarization-Rotating Splitter/Combiner," U.S. Appl. No. 15/475,805, filed Mar. 31, 2017 (28 pages).

\* cited by examiner

BIREFRINGENT WAVEGUIDE CIRCUIT HAVING AN OPTICAL HYBRID

BACKGROUND

Field

The present disclosure relates to optical communication equipment and, more specifically but not exclusively, to a birefringent waveguide circuit having an optical hybrid that can be used, e.g., in an optical transport system.

Description of the Related Art

This section introduces aspects that may help facilitate a better understanding of the disclosure. Accordingly, the statements of this section are to be read in this light and are not to be understood as admissions about what is in the prior art or what is not in the prior art.

Photonic integrated circuits (PICs) are widely used in various elements and components of fiber-optic networks. Implementing such circuits with standard silicon complementary-metal-oxide-semiconductor (CMOS) technology and/or the silicon-on-insulator (SOI) platform holds the hope of minimizing production costs, e.g., through monolithic integration of electronic and optical functions and the use of the massive existing CMOS manufacturing infrastructure. As a result, CMOS-compatible PICs are being actively developed by the telecom industry.

SUMMARY OF SOME SPECIFIC EMBODIMENTS

Disclosed herein are various embodiments of a waveguide circuit that can be used as an optical hybrid, e.g., in CMOS-compatible PICs. In an example embodiment, the waveguide circuit is a 1×4 device having a single optical input and four optical outputs. The two optical input signals to be mixed in the waveguide circuit are applied to the single optical input as transverse electric (TE) and transverse magnetic (TM) polarization components, respectively, of the corresponding polarization-multiplexed optical input signal. In response to the latter, the waveguide circuit causes the four outputs to receive four different relative-phase combinations of the two optical input signals, with each combination being coupled into a TE waveguide mode of a waveguide connected to the respective optical output. A PIC having one or more instances of the waveguide circuit can be used, e.g., to implement a coherent optical receiver, wherein the TE and TM polarization components of the corresponding polarization-multiplexed optical input signal are a data-modulated optical communication signal and a local-oscillator signal, respectively, or vice versa.

According to an example embodiment, provided is an apparatus comprising: a substrate having a surface; and an optical device being located along the surface and having an optical input and four optical outputs, each of the optical outputs being connected to receive a different respective combination of light from the optical input via multiple optical paths of the optical device; and wherein, at each of the optical outputs, the different respective combination is a mixture of a first polarization component of the light from the optical input and a different respective relative phase of a second polarization component of the light from the optical input, the first and second polarization components being relatively orthogonal.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

One of the problems with silicon/silicon oxide waveguides of CMOS/SOI PICs is that they have a relatively large difference between the refractive indices of the core and cladding, due to which such waveguides are often referred to as the "high refractive-index-contrast waveguides." For these waveguides, the transverse electric (TE) and transverse magnetic (TM) polarizations can have a relatively large difference in their group indices, i.e., effective refractive indices. This relatively large group-index difference makes it relatively difficult to construct a polarization-diverse PIC that has a substantially polarization-independent response and/or is capable of appropriately handling polarization-division-multiplexed (PDM) communication signals.

At least some of these and related problems in the state of the art can be addressed using various embodiments of an optical hybrid disclosed herein. Some embodiments can advantageously be used to construct coherent optical receivers of PDM communication signals. Particularly beneficial can be the concomitant ability to make the corresponding PICs using standard CMOS fabrication processes used in silicon foundries.

Figure 1:
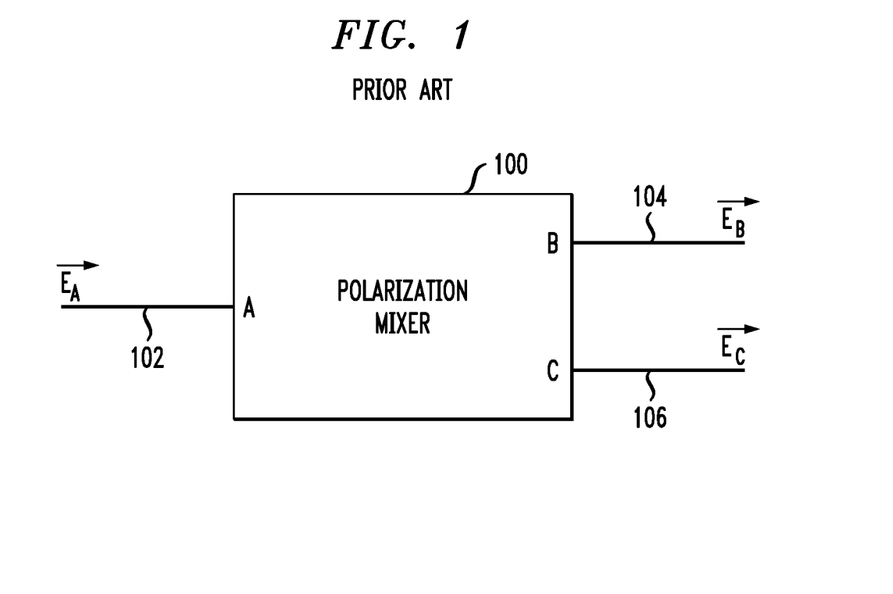
FIG. 1 shows a schematic diagram of a polarization mixer that can be used in various embodiments.

FIG. 1 shows a schematic diagram of a polarization mixer 100 that can be used in various embodiments. Polarization mixer 100 has three ports that are labeled in FIG. 1 as A, B, and C, respectively. For illustration purposes and without any implied limitations, polarization mixer 100 is described below in reference to a configuration in which port A operates as an input port, and ports B and C operate as output ports.

Figure 2:
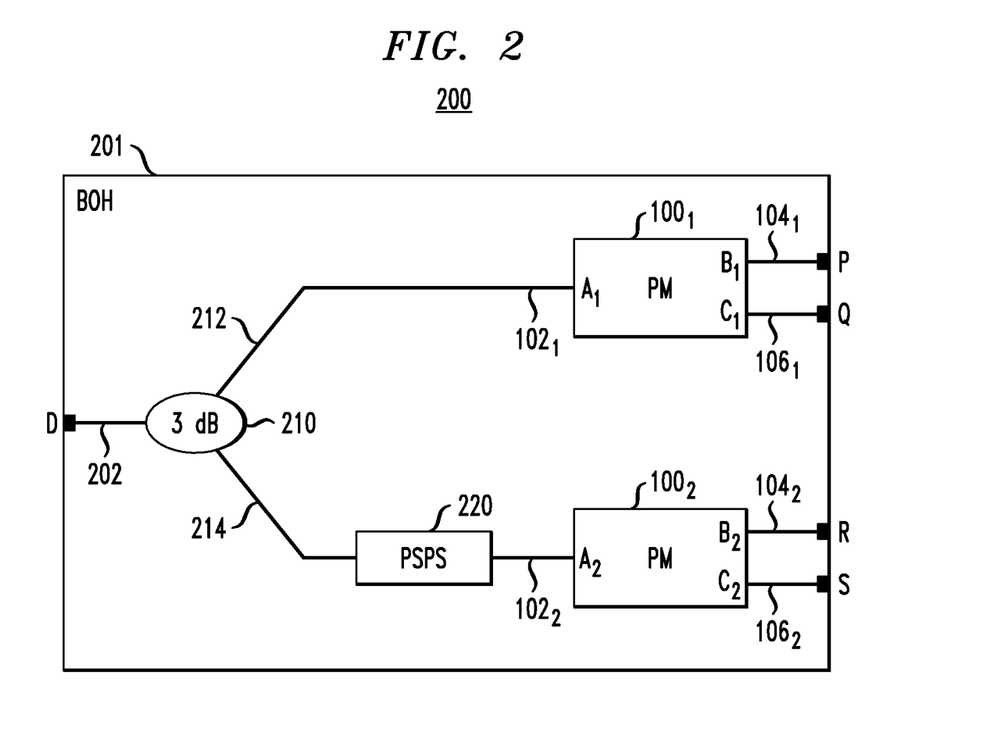
FIG. 2 shows a schematic top view of a waveguide circuit according to an embodiment.

In an example embodiment, polarization mixer 100 can be a part of a corresponding PIC and be connected to other optical elements of the PIC using optical waveguides 102, 104, and 106 coupled to ports A, B, and C, respectively, as indicated in FIG. 1 (also see FIG. 2).

Let us suppose that optical waveguide 102 operates to apply to port A of polarization mixer 100 a light beam whose electric-field vector $\vec{E}_A$ is described by Eq. (1):

$$\vec{E}_A = (E_1, E_2) \quad (1)$$

where $E_1$ and $E_2$ are the field strengths of the TE and TM polarization components, respectively. Then, in response to this light beam received at port A, ports B and C apply to waveguides 104 and 106 the light beams whose electric-field vectors $\vec{E}_B$ and $\vec{E}_C$ can be approximated using Eqs. (2) and (3), respectively:

$$\vec{E}_B = (a_1(E_1+E_2), 0) \quad (2)$$

$$\vec{E}_C = (a_2(E_1-E_2), 0) \quad (3)$$

where $a_1$ and $a_2$ are coefficients; and $|a_1|^2+|a_2|^2 \leq 1$. In some embodiments, $a_1$ and $a_2$ can be real-valued. In some embodiments, $a_1 = a_2$.

As can be seen from Eqs. (2) and (3), both of the light beams applied by ports B and C of polarization mixer 100 to waveguides 104 and 106 have a TE polarization, with the TE field strengths being proportional to the sum and difference, respectively, of the field strengths of the TE and TM polarizations of the light beam applied by waveguide 102 to port A of the polarization mixer. In this sense, polarization mixer 100 mixes the light of the two orthogonal (TE and TM) input polarizations applied to port A to generate a respective TE polarization at each of ports B and C, while transferring substantially no light to the respective TM polarizations thereat.

In some embodiments, polarization mixer 100 can be designed to respond to electric field $\vec{E}_A$ (Eq. (1)) by generating at ports B and C two different independent linear combinations of the field strengths $E_1$ and $E_2$, not necessarily proportional to the sum and difference of these field strengths.

An example waveguide structure that can be used to implement polarization mixer 100 is disclosed, e.g., in U.S. Patent Application Publication No. 2016/0246005, which is incorporated herein by reference in its entirety.

In some embodiments, polarization mixer 100 can be modified to not necessarily constrain the electric field vectors $\vec{E}_B$ and $\vec{E}_C$ to the TE polarization. For example, polarization mixer 100 can be implemented in a manner that causes the magnitudes of the electric field vectors $\vec{E}_B$ and $\vec{E}_C$ to be approximated by Eqs. (2a)-(3a) as follows:

$$|\vec{E}_B| = |a_1(E_1+E_2)| \quad (2a)$$

$$|\vec{E}_C| = |a_2(E_1-E_2)| \quad (3a)$$

In such embodiments, the orientations of the electric field vectors $\vec{E}_B$ and $\vec{E}_C$ can be different, e.g., not parallel to one another. In some embodiments, the respective orientations of the electric field vectors $\vec{E}_B$ and $\vec{E}_C$ may not correspond to either TE or TM polarization. In some embodiments, a modified polarization mixer 100 may incorporate one or more internal polarization rotators.

In an example embodiment corresponding to Eqs. (2a) and (3a), the output field strengths are proportional to the sum and difference, respectively, of the field strengths of the TE and TM polarizations of the light beam applied by waveguide 102 to port A of the polarization mixer. Thus, in such an embodiment, polarization mixer 100 can mix the light of the two orthogonal (TE and TM) input polarizations applied to port A to generate a single polarization (which is not necessarily a TE polarization) at each of output ports B and C whose amplitude is the sum and difference, respectively, of the amplitudes of the two polarizations of light received at input port A. However, in some embodiments, as indicated in Eqs. (2) and (3), both of the light beams output at the output ports B and C of polarization mixer 100 to waveguides 104 and 106 may have a TE polarization.

FIG. 2 shows a schematic diagram of a waveguide circuit 200 according to an embodiment. Circuit 200 has five ports that are labeled in FIG. 2 as D, P, Q, R, and S, respectively. In an example configuration, port D operates as an input port, and ports P-S operate as output ports. As explained in more detail below, circuit 200 can be used as an optical 90-degree hybrid.

As used herein, the term "optical hybrid" refers to an optical mixer designed to mix a first optical input signal having a carrier frequency and a second optical input signal having approximately the same (e.g., to within ±5 GHz or ±10 GHz) carrier frequency to generate a plurality of mixed optical signals corresponding to different relative phase shifts between the two optical input signals. An optical 90-degree hybrid is a particular type of an optical hybrid that is designed to produce at least four mixed optical signals corresponding to the relative phase shifts between the two optical input signals of approximately 0, 90, 180, and 270 degrees, respectively (e.g., to within an acceptable tolerance). Depending on the intended application, the acceptable relative angular mixing tolerances can be, e.g., to within ±5 degrees or ±10 degrees, etc. A person of ordinary skill in the art will understand that each of the relative phase shifts is defined without accounting for a possible additional phase shift that is an integer multiple of 360 degrees.

The following difference between a conventional optical 90-degree hybrid and circuit 200 should however be noted. A conventional optical 90-degree hybrid is a 2×4 device having two input ports and four output ports. The two optical input signals to be mixed in the conventional optical 90-degree hybrid are typically applied to different respective input ports thereof. In contrast, circuit 200 is a 1×4 device having one input port and four output ports. The two optical input signals to be mixed in circuit 200 are applied to the same (e.g., single) input port thereof as TE and TM polarization components, respectively, of a corresponding polarization-multiplexed optical input signal. Despite this difference, circuit 200 operates to generate mixed optical signals having the above-indicated relative phase shifts, e.g., as described in more detail below.

As evident from the subsequent description, circuit 200 is designed and configured to make use of and rely on the birefringent characteristics of waveguides therein. As such, circuit 200 can be referred to as a birefringent optical hybrid (BOH).

In an example embodiment, circuit 200 comprises a power splitter 210, a polarization-sensitive phase shifter (PSPS) 220, and two instances (nominal copies) of polarization mixer 100 (labeled in FIG. 2 as PM $100_1$ and PM $100_2$), all connected as indicated in FIG. 2. More specifically, PSPS 220 is connected between splitter 210 and polarization mixer $100_2$. A waveguide 202 is disposed to optically connect port D of circuit 200 to splitter 210. Waveguides $104_1$, $106_1$, $104_2$, and $106_2$ are disposed to optically connect polarization mixers $100_1$ and $100_2$ to ports P-S, respectively, of circuit 200.

In an example embodiment, power splitter 210 can be a conventional 3-dB power splitter (as illustratively indicated in FIG. 2) that operates to equally split, in a polarization-independent manner, the optical power applied thereto by waveguide 202 and then applies the resulting two light beams to waveguides 212 and 214, respectively. Each of these two light beams carries an attenuated copy of the optical signal originally received at port D.

PSPS 220 operates to introduce a relative phase shift of ~90 degrees between the TE and TM polarization components of the signal copy propagating therethrough, e.g., the signal copy being applied to input port $A_2$ of polarization mixer $100_2$, as compared to the signal copy being applied to input port $A_1$ of polarization mixer $100_1$. In an example embodiment, PSPS 220 can be implemented using an appropriate length of a birefringent silicon/silicon oxide waveguide, wherein the TE polarization has a higher effective group index than the TM polarization. A person of ordinary skill in the art will understand that alternative implementations of PSPS 220 are also possible.

In an example embodiment, power splitter 210, PSPS 220, polarization mixers $100_1$ and $100_2$, and the various waveguides shown in FIG. 2 can be manufactured on and/or supported on a common substrate 201.

Based on the above-presented description of polarization mixer 100 and the above-indicated properties of splitter 210 and PSPS 220, it can be verified in a relatively straightforward manner that circuit 200 causes the following approximate relationship between the respective electric fields at ports D, P, Q, R, and S thereof. For example, if the electric-field vector $\vec{E}_D$ at port D is described by Eq. (4):

$$\vec{E}_D = (E_1, E_2) \tag{4}$$

then, the electric-field vectors $\vec{E}_P$, $\vec{E}_Q$, $\vec{E}_R$, and $\vec{E}_S$ at ports P-S, respectively, can be approximated using Eqs. (5)-(8):

$$\vec{E}_P = \left(\frac{a_1}{\sqrt{2}}(E_1 + E_2), 0\right) \tag{5}$$

$$\vec{E}_Q = \left(\frac{a_2}{\sqrt{2}}(E_1 - E_2), 0\right) \tag{6}$$

$$\vec{E}_R = \left(\frac{a_1}{\sqrt{2}}(E_1 + jE_2), 0\right) \tag{7}$$

$$\vec{E}_S = \left(\frac{a_2}{\sqrt{2}}(E_1 - jE_2), 0\right) \tag{8}$$

A person of ordinary skill in the art will recognize that the relationships between the TE components of output electric-field vectors $\vec{E}_R$, $\vec{E}_Q$, $\vec{E}_R$, and $\vec{E}_S$ and the input electric fields $E_1$ and $E_2$ given by Eqs. (5)-(8) are qualitatively similar to those between the output and input electric fields of two approximately parallel-polarized signals $(E_1, 0)$ and $(E_2, 0)$ mixed in a conventional optical 90-degree hybrid. An example of the latter with the corresponding relevant formulas can be found, e.g., in U.S. Pat. No. 8,275,224, which is incorporated herein by reference in its entirety).

In particular, in electric-field vector $\vec{E}_P$, the TE-polarization component thereof has electric fields $E_1$ and $E_2$ mixed with a relative phase shift of about 0 degrees (=0 radians). In electric-field vector $\vec{E}_Q$, the TE-polarization component thereof has electric fields $E_1$ and $E_2$ mixed with a relative phase shift of about 180 degrees (=π radians). In electric-field vector $\vec{E}_R$, the TE-polarization component thereof has electric fields $E_1$ and $E_2$ mixed with a relative phase shift of about 90 degrees (=π/2 radians). In electric-field vector $\vec{E}_S$, the TE-polarization component thereof has electric fields $E_1$ and $E_2$ mixed with a relative phase shift of about 270 degrees (=3π/2 radians).

In an alternative embodiment, circuit 200 can be implemented using modified polarization mixers $100_1$ and $100_2$ configured to operate in accordance with Eqs. (2a)-(3a). In such an embodiment, the relationships between the magnitudes of the output electric-field vectors $\vec{E}_R$, $\vec{E}_Q$, $\vec{E}_R$, and $\vec{E}_S$ and the input electric fields $E_1$ and $E_2$ is given by Eqs. (5a)-(8a):

$$|\vec{E}_P| = \left|\frac{a_1}{\sqrt{2}}(E_1 + E_2)\right| \tag{5a}$$

$$|\vec{E}_Q| = \left|\frac{a_2}{\sqrt{2}}(E_1 - E_2)\right| \tag{6a}$$

$$|\vec{E}_R| = \left|\frac{a_1}{\sqrt{2}}(E_1 + jE_2)\right| \tag{7a}$$

$$|\vec{E}_S| = \left|\frac{a_2}{\sqrt{2}}(E_1 - jE_2)\right| \tag{8a}$$

An example embodiment of circuit 200 may have one or more of the following advantages over a conventional optical 90-degree hybrid. Unlike the latter, circuit 200 can be implemented to have no waveguide crossings therein. PSPS 220 is typically capable of providing a relatively accurate (e.g., to within ±2 degrees) 90-degree phase shift over a relatively wide spectral range, e.g., for wavelengths between 1450 nm and 1650 nm, which is significantly better than the typical capabilities of a conventional optical 90-degree hybrid. Circuit 200 can be designed to exhibit satisfactory performance characteristics even if manufactured with relaxed tolerances, e.g., when sufficiently wide (e.g., wider than 650 nm) silicon nanowires are used as waveguide cores.

Figure 3:
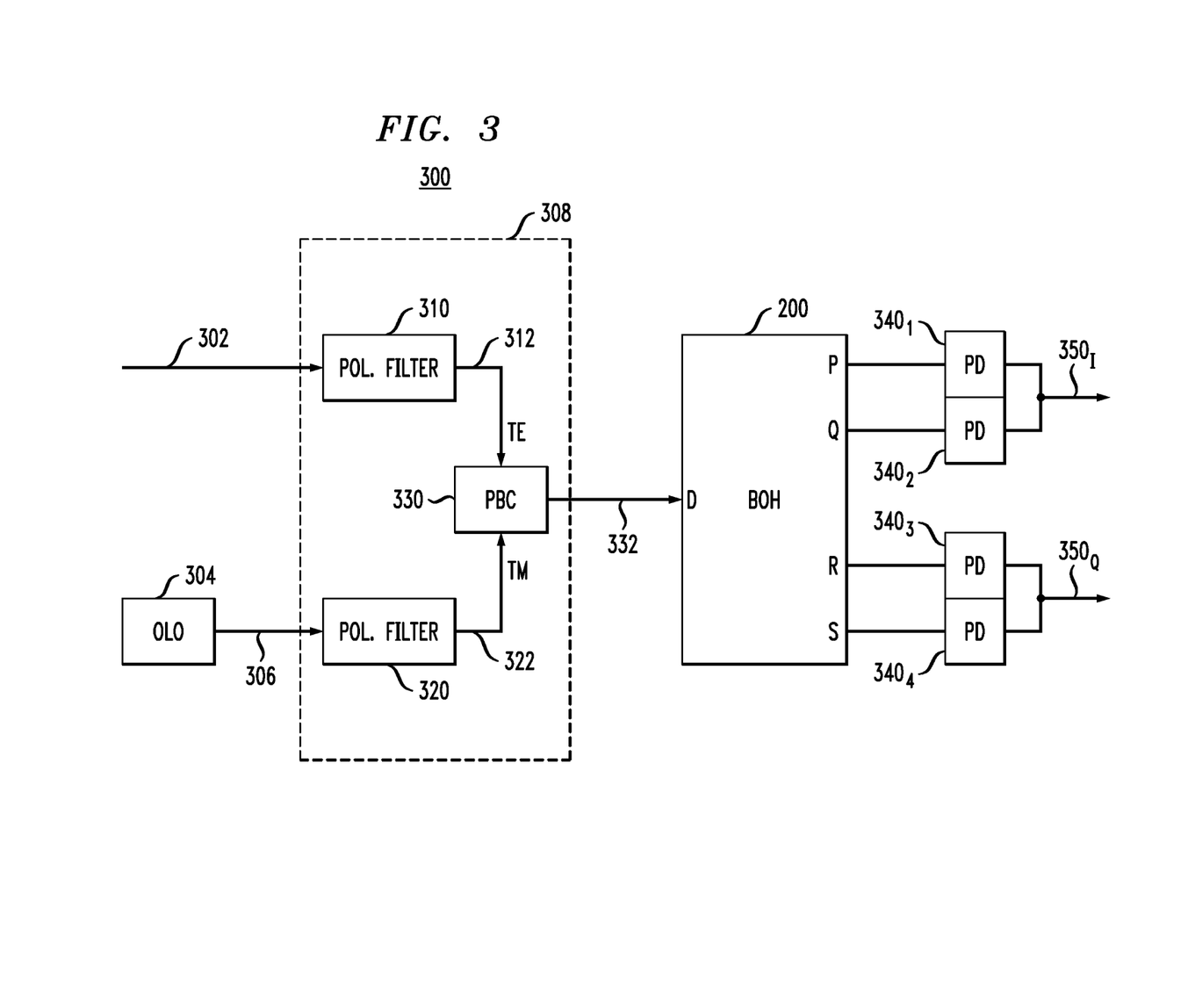
FIG. 3 shows a block diagram of a coherent optical receiver that can use the waveguide circuit of FIG. 2 according to an embodiment.

FIG. 3 shows a block diagram of a coherent optical receiver 300 according to an embodiment. Receiver 300 is implemented using circuit 200 (FIG. 2) as indicated in FIG. 3. In operation, receiver 300 detects an optical input signal 302 using an optical local-oscillator (OLO) signal 306 generated by an OLO source (e.g., laser) 304. Electrical output signals $350_I$ and $350_Q$ generated by receiver 300 in response to signals 302 and 306 are indicative of the modulations of the in-phase and quadrature components, respectively, of optical input signal 302 measured in the complex plane defined by OLO signal 306. Electrical output signals $350_I$ and $350_Q$ can be further processed in a conventional manner, e.g., using a digital signal processor (not explicitly shown in FIG. 3), to recover the data encoded in optical input signal 302.

Receiver 300 comprises a 2×1 optical coupler 308 configured to (i) generate a polarization-multiplexed optical signal 332 in response to signals 302 and 306, and (ii) apply optical signal 332 to port D of circuit 200. In an example embodiment, optical signal 332 has a TE polarization component and a TM polarization component. In operation, optical coupler 308 causes optical input signal 302 to populate one of the TE and TM polarization components of optical signal 332 while causing OLO signal 306 to populate the other one of the TE and TM polarization components of optical signal 332. In some embodiments, optical coupler 308 can be designed to cause signals 302 and 306 to populate the TE and TM polarization components, respectively, of optical signal 332. In some other embodiments, optical coupler 308 can be designed to cause signals 302 and 306 to populate the TM and TE polarization components, respectively, of optical signal 332.

As an example, FIG. 3 shows a block diagram of optical coupler 308 designed to cause signals 302 and 306 to populate the TE and TM polarization components, respectively, of optical signal 332. A person of ordinary skill in the art will understand that alternative embodiments of optical coupler 308, in which the optical coupler causes signals 302 and 306 to populate the TM and TE polarization components, respectively, of optical signal 332 can similarly be constructed.

In the embodiment shown in FIG. 3, optical coupler 308 comprises optional polarization filters 310 and 320 and a polarization beam combiner (PBC) 330. Optical input signal 302 is applied to polarization filter 310 that operates to cause a resulting filtered optical signal 312 to have a TE polarization. OLO signal 306 is applied to a polarization filter 320 that similarly operates to cause a resulting filtered optical signal 322 to have a TM polarization. PBC 330 operates to polarization-multiplex optical signals 312 and 322 in a conventional manner and apply the resulting polarization-multiplexed optical signal 332 to port D of circuit 200.

In some embodiments, e.g., when signals 302 and 306 are linearly polarized, polarization filters 310 and 320 can be replaced by the corresponding polarization rotators that appropriately rotate the respective input polarizations to generate optical signals 312 and 322.

Receiver 300 further comprises an array of photodetectors (e.g., balanced pairs of photo-diodes, PDs) $340_1$-$340_4$ optically coupled in a pair-wise, balanced configuration to ports P-S, respectively, of circuit 200. In operation, photodetectors $340_1$-$340_4$ generate electrical output signals $350_I$ and $350_Q$ in response to optical signal 332.

Figure 4:
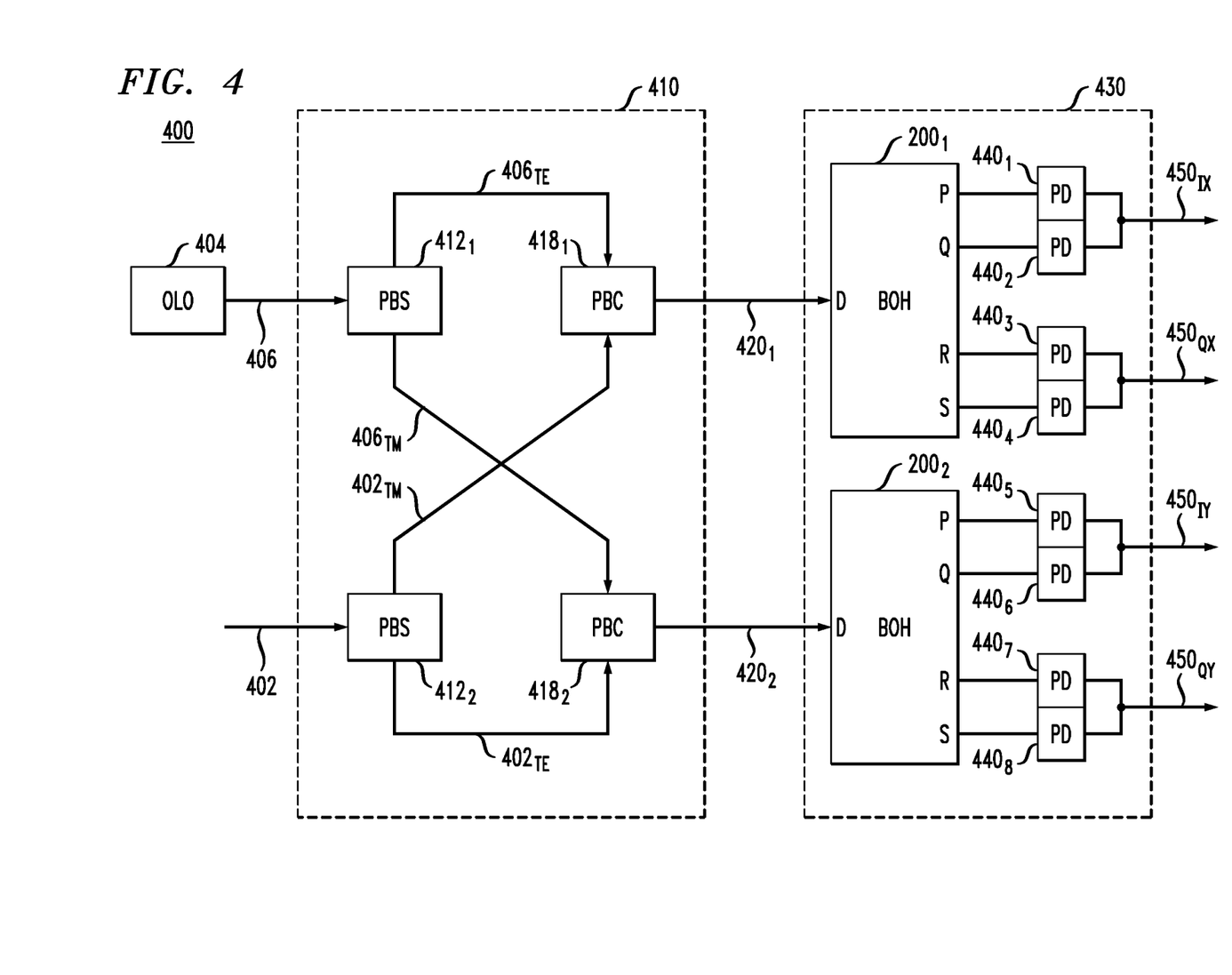
FIG. 4 shows a block diagram of a coherent optical receiver that can use the waveguide circuit of FIG. 2 according to an alternative embodiment.

FIG. 4 shows a block diagram of a coherent optical receiver 400 according to an alternative embodiment. As indicated in FIG. 4, receiver 400 is implemented using two instances of circuit 200 (FIG. 2), which are labeled in FIG. 4 as $200_1$ and $200_2$, respectively. Receiver 400 functionally differs from receiver 300 (FIG. 3) in that receiver 400 is a dual-polarization receiver that can be used to coherently detect PDM communication signals.

In operation, receiver 400 detects the modulation of an optical input signal 402 using an OLO signal 406 generated by an OLO source (e.g., laser) 404. The electrical output signals $450_{IX}$ and $450_{QX}$ generated by receiver 400 are approximately indicative of the in-phase and quadrature components, respectively, of a first (e.g., X) polarization of optical input signal 402. The electrical output signals $450_{IY}$ and $450_{QY}$ similarly generated by receiver 400 are approximately indicative of the in-phase and quadrature components, respectively, of a second (e.g., Y) polarization of optical input signal 402. The four electrical output signals 450 can be further processed in a conventional manner to recover the data encoded in transmitted versions of each of the two orthogonal polarizations of optical input signal 402.

Receiver 400 comprises a 2×2 optical coupler 410 and an optical-to-electrical (O/E) converter 430. Coupler 410 couples received optical signals 402 and local oscillator light 406 as orthogonal components in optical signals $420_1$ and $420_2$, e.g., in a polarization mixture suitable for detection in O/E converter 430. O/E converter 430 then generates the four electrical output signals 450 in response to receiving optical signals $420_1$ and $420_2$.

Coupler 410 comprises polarization beam splitters (PBS's) $412_1$ and $412_2$ and polarization beam combiners (PBC's) $418_1$ and $418_2$ interconnected as indicated in FIG. 4. PBS $412_1$ operates to decompose OLO signal 406 into TM and TE polarization components, which are labeled in FIG. 4 as $406_{TM}$ and $406_{TE}$, respectively. PBS $412_2$ similarly operates to decompose optical input signal 402 into TM and TE polarization components, which are labeled in FIG. 4 as $402_{TM}$ and $402_{TE}$, respectively. PBC $418_1$ operates to polarization-multiplex signals $406_{TE}$ and $402_{TM}$, thereby generating optical signal $420_1$. PBC $418_2$ similarly operates to polarization-multiplex signals $406_{TM}$ and $402_{TE}$, thereby generating optical signal $420_2$.

O/E converter 430 comprises circuit $200_1$ and photodetectors (e.g., photo-diodes, PDs) $440_1$-$440_4$ optically coupled in conventional pair-wise, balanced electrical configurations to ports P-S, respectively, of that circuit. In operation, circuit $200_1$ and PDs $440_1$-$440_4$ of O/E converter 430 generate electrical output signals $450_{IX}$ and $450_{QX}$ in substantially the same manner as circuit 200 and PDs $340_1$-$340_4$ of receiver 300 (FIG. 3) generate electrical output signals $350_I$ and $350_Q$.

O/E converter 430 further comprises circuit $200_2$ and PDs $440_5$-$440_8$ optically coupled in a pair-wise, balanced configuration to ports P-S, respectively, of that circuit. Circuit $200_2$ and PDs $440_5$-$440_8$ operate similar to circuit $200_1$ and PDs $440_1$-$440_4$ to generate electrical output signals $450_{IY}$ and $450_{QY}$.

FIGS. 5A-5D show block diagrams of 2×2 optical coupler 410 that can be used in receiver 400 according to some alternative embodiments.

Figure 5A:
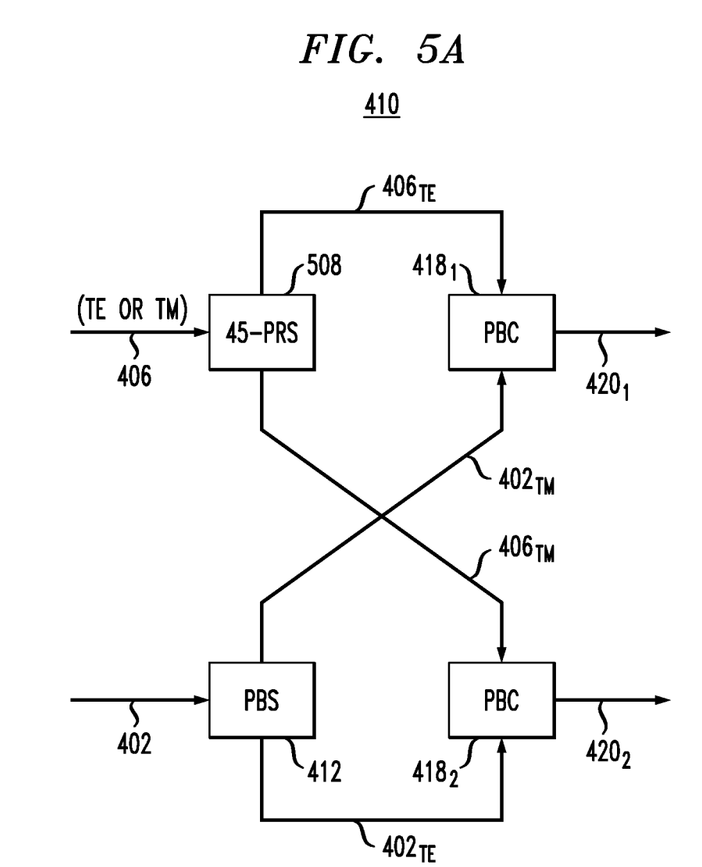
FIGS. 5A-5D show block diagrams of an optical coupler that can be used in the coherent optical receiver of FIG. 4 according to some alternative embodiments.

The embodiment of coupler 410 shown in FIG. 5A differs from the embodiment of coupler 410 shown in FIG. 4 in that PBS $412_1$ is replaced by a 45-degree polarization rotator and splitter (45-PRS) 508. 45-PRS 508 is a three-port device that can be configured to receive a single polarization, either TE or TM, and cause the received optical power to be split into two equal parts and output the two resulting optical signals at respective output ports with TE and TM polarizations, respectively. This particular embodiment of coupler 410 can be used, e.g., when OLO signal 406 has either a TE polarization or a TM polarization. In either case, the optical output beams at the two output ports of 45-PRS 508 are TE- and TM-polarized, respectively. The TE-polarized optical output beam from one port of 45-PRS 508 is used as OLO signal $406_{TE}$. The TM-polarized optical output beam from the other port of 45-PRS 508 is used as OLO signal $406_{TM}$.

In some embodiments, 45-PRS 508 can be implemented using a combination of PM 100 with a conventional polarization beam splitter. However, known integrated versions of 45-PRS 508, wherein the corresponding integrated 1×2 port device has the above-described functionality, may be more suitable due to its inherently lower insertion losses.

Figure 5B:
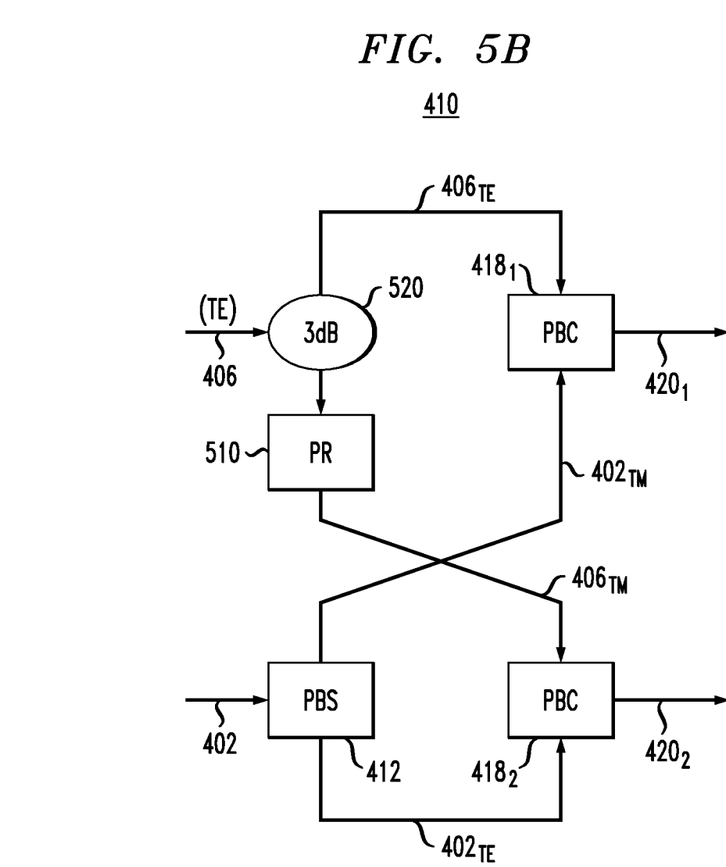

The embodiment of coupler 410 shown in FIG. 5B differs from the embodiment of coupler 410 shown in FIG. 5A in that 45-PRS 508 is replaced by a combination of a 3-dB power splitter 520 and a polarization rotator (PR) 510. This particular embodiment of coupler 410 can be used, e.g., when OLO signal 406 has a TE polarization. One of the two TE-polarized optical output beams produced by splitter 520 at the output ports thereof is used as OLO signal $406_{TE}$. The other of the two TE-polarized optical output beams undergoes a TE-to-TM mode conversion in polarization rotator 510, and the resulting TM-polarized optical beam is used as OLO signal $406_{TM}$.

Figure 5C:
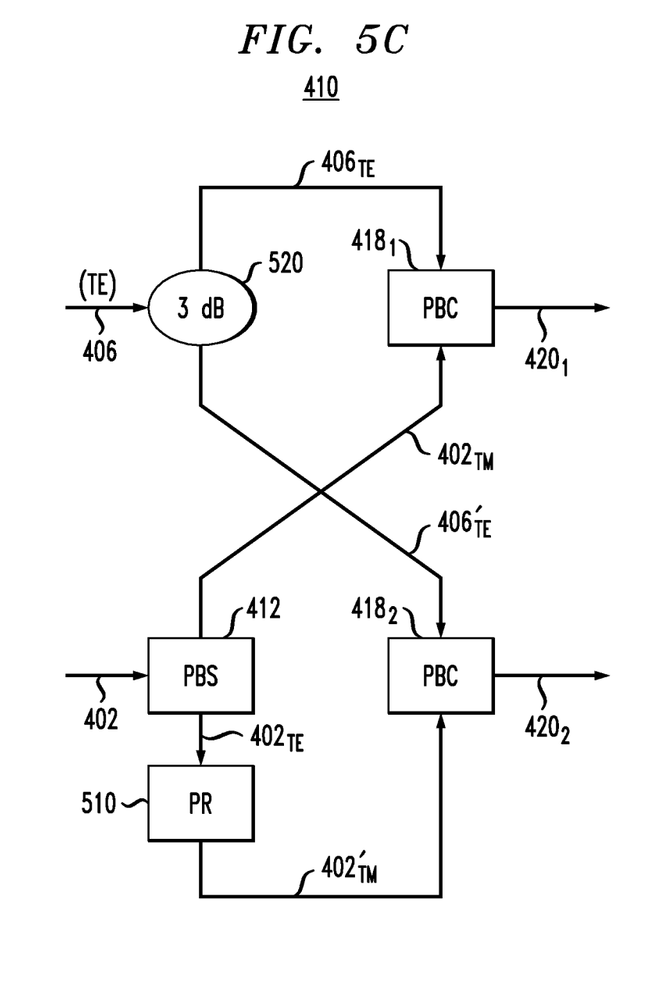

The embodiment of coupler 410 shown in FIG. 5C differs from the embodiment of coupler 410 shown in FIG. 5B in that polarization rotator 510 is moved to be connected between PBS $412_2$ and PBC $418_2$ instead of being connected between coupler 520 and PBC $418_2$. This particular embodiment of coupler 410 can be used, e.g., when OLO signal 406 has a TE polarization. In the new position, polarization rotator 510 operates to perform a TE-to-TM mode conversion on optical signal $402_{TE}$, thereby generating optical signal $402'_{TM}$. PBC $418_2$ then operates to generate signal $420_2$ by polarization-multiplexing the TM-polarized optical signal $402'_{TM}$ received from polarization rotator 510 and the TE-polarized OLO signal $406'_{TE}$ received directly from coupler 520.

Figure 5D:
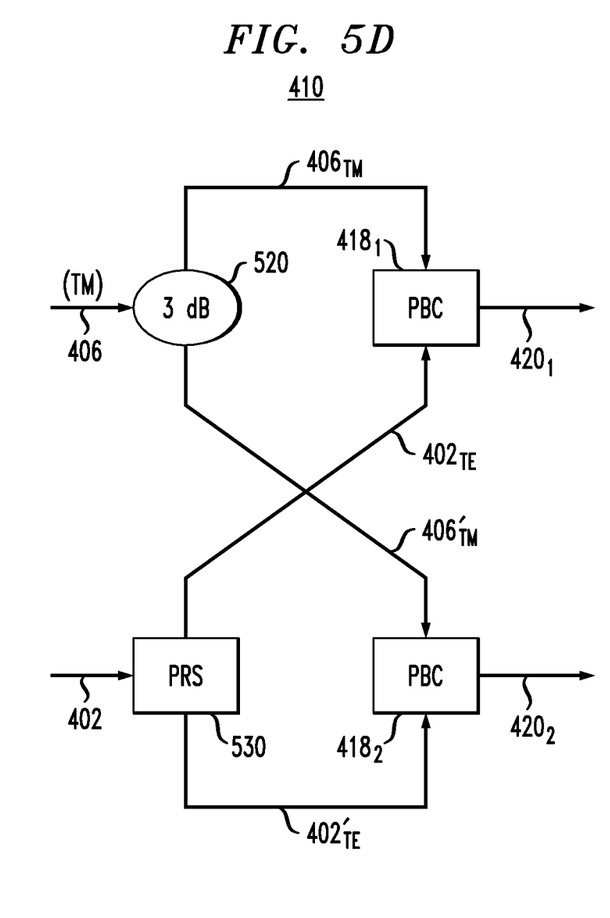

The embodiment of coupler 410 shown in FIG. 5D differs from the embodiment of coupler 410 shown in FIG. 5C in that PBS 412 and polarization rotator 510 are replaced by a single element, i.e., a polarization-rotating splitter (PRS) 530. An example polarization-rotating splitter that can be used as PRS 530 is disclosed, e.g., in U.S. patent application Ser. No. 15/475,805, which is incorporated herein by reference in its entirety.

In operation, PRS 530 transfers the TE polarization component of optical signal 402 to one output port thereof, thereby generating the TE-polarized optical signal $402_{TE}$. PRS 530 also rotates the polarization of the TM-polarization component of optical signal 402 and outputs the resulting TE-polarized optical signal $402'_{TE}$ at the other output port thereof. PBC $418_1$ operates to generate signal $420_1$ by polarization-multiplexing the TM-polarized OLO signal $406_{TM}$ received from splitter 520 and the TE-polarized optical signal $402_{TE}$ received from PRS 530. PBC $418_2$ operates to generate signal $420_2$ by polarization-multiplexing the TM-polarized OLO signal $406'_{TM}$ received from coupler 520 and the TE-polarized optical signal $402'_{TE}$ received from PRS 530.

According to an example embodiment disclosed above in reference to FIGS. 1-5, provided is an apparatus (e.g., 300, FIG. 3; 400, FIG. 4) comprising: a substrate (e.g., 201, FIG. 2) having a surface; and an optical device (e.g., 200, FIGS. 2, 3, 4) being located along the surface and having an optical input (e.g., D, FIG. 2) and four optical outputs (e.g., P-S, FIG. 2), each of the optical outputs being connected to receive a different respective combination of light from the optical input via multiple optical paths (e.g., D→P, D→Q, D→R, and D→S) of the optical device; and wherein, at each of the optical outputs, the different respective combination is a mixture of a first (e.g., TE) polarization component of the light from the optical input and a different respective relative phase of a second (e.g., TM) polarization component of the light from the optical input, the first and second polarization components being relatively orthogonal.

In some embodiments of the above apparatus, the four different respective combinations are mixtures of the light of the first and second polarization components with relative phases of 0±5 degrees, 90±5 degrees, 180±5 degrees, and 270±5 degrees, respectively.

In some embodiments of any of the above apparatus, the apparatus further comprises a coherent optical receiver (e.g., 300, FIG. 3; 400, FIG. 4) that includes an optical local-oscillator source (e.g., 304, FIG. 3) and the optical device; and wherein the coherent optical receiver is configured to cause the first polarization component to be an optical communication signal received by the coherent optical receiver, and the second polarization component to be an optical local-oscillator signal generated by the optical local-oscillator source.

According to another example embodiment disclosed above in reference to FIGS. 1-5, provided is an apparatus (e.g., 300, FIG. 3; 400, FIG. 4) comprising: a substrate (e.g., 201, FIG. 2) having a planar surface; and a first waveguide circuit (e.g., 200, FIGS. 2, 3, 4) being along the planar surface and having an optical input (e.g., D, FIG. 2) and four optical outputs (e.g., P-S, FIG. 2) connected to receive light from the optical input; and wherein the first waveguide circuit is configured to cause the four optical outputs to receive four different respective relative-phase combinations of first (e.g., TE) and second (e.g., TM) polarization components of the light from the optical input, the first and second polarization components having approximately the same (e.g., to within ±10 GHz) carrier frequency.

In some embodiments of the above apparatus, the four different respective relative-phase combinations are combinations of light of the first and second polarization components with relative phases of approximately (e.g., to within ±5 degrees) 0 degrees, 90 degrees, 180 degrees, and 270 degrees, respectively.

In some embodiments of any of the above apparatus, the first and second polarization components are transverse electric and transverse magnetic waveguide modes, respectively.

In some embodiments of any of the above apparatus, each of the four different respective relative-phase combinations is coupled into a transverse electric waveguide mode (e.g., in accordance with Eqs. (5)-(8)) of a respective waveguide (e.g., $104_1$, $106_1$, $104_2$, or $106_2$, FIG. 2) connected to a respective one of the four optical outputs.

In some embodiments of any of the above apparatus, the first waveguide circuit is configured to cause transverse magnetic waveguide modes of the respective waveguides to receive substantially no light from the optical input (e.g., in accordance with Eqs. (5)-(8)). As used herein, the term "substantially no light" should be interpreted to mean no more than ~5% of the corresponding optical power.

In some embodiments of any of the above apparatus, the first waveguide circuit is a part of an optical receiver (e.g., 300, FIG. 3; 400, FIG. 4); and wherein the optical receiver is configured to cause the first polarization component to be populated by an optical communication signal (e.g., 302, FIG. 3; 402, FIG. 4), and the second polarization component to be populated by an optical local-oscillator signal (e.g., 306, FIG. 3; 406, FIG. 4).

In some embodiments of any of the above apparatus, the optical receiver comprises a laser (e.g., 304, FIG. 3; 404, FIG. 4) configured to generate the optical local-oscillator signal.

In some embodiments of any of the above apparatus, the optical receiver comprises an optical coupler (e.g., 308, FIG. 3; 410, FIGS. 4, 5A, 5C, and 5D) configured to cause the first and second polarization components to be transverse electric and transverse magnetic waveguide modes, respectively.

In some embodiments of any of the above apparatus, the optical receiver comprises an optical coupler (e.g., 410, FIGS. 4 and 5A-5C) configured to cause the first and second polarization components to be transverse magnetic and transverse electric waveguide modes, respectively.

In some embodiments of any of the above apparatus, the first waveguide circuit comprises: a power splitter (e.g., 210, FIG. 2) connected to split an input signal received through the optical input into first and second signal portions; a polarization-sensitive phase shifter (e.g., 220, FIG. 2) configured to introduce a relative phase shift of approximately 90 degrees (e.g., to within ±5 degrees) between transverse electric and transverse magnetic waveguide modes of the second signal portion to generate a corresponding phase-shifted optical signal; a first polarization mixer (e.g., $100_1$, FIG. 2) configured to generate first and second relative-phase combinations of the four different respective relative-phase combinations, an electric-field strength of the first relative-phase combination being proportional to a sum of electric-field strengths of transverse electric and transverse magnetic waveguide modes of the first signal portion, and an electric-field strength of the second relative-phase combination being proportional to a difference of the electric-field strengths of the transverse electric and transverse magnetic waveguide modes of the first signal portion (e.g., in accordance with Eqs. (2)-(3)); and a second polarization mixer (e.g., $100_2$, FIG. 2) configured to generate third and fourth relative-phase combinations of the four different respective relative-phase combinations, an electric-field strength of the third relative-phase combination being proportional to a sum of electric-field strengths of transverse electric and transverse magnetic waveguide modes of the corresponding phase-shifted optical signal, and an electric-field strength of the fourth relative-phase combination being proportional to a difference of the electric-field strengths of the transverse electric and transverse magnetic waveguide modes of the corresponding phase-shifted optical signal (e.g., in accordance with Eqs. (2)-(3)).

In some embodiments of any of the above apparatus, each of respective optical signals having the first, second, third, and fourth relative-phase combinations is coupled into a transverse electric waveguide mode (e.g., in accordance with Eqs. (2)-(3)) of a respective waveguide (e.g., $104_1$, $106_1$, $104_2$, or $106_2$, FIG. 2) connected to a respective one of the four optical outputs.

In some embodiments of any of the above apparatus, the first waveguide circuit is configured to cause transverse magnetic waveguide modes of the respective waveguides to receive substantially no light from the optical input (e.g., in accordance with Eqs. (2)-(3)).

In some embodiments of any of the above apparatus, the apparatus further comprises an array of photodetectors (e.g., $340_1$-$340_4$, FIG. 3; $440_1$-$440_4$ or $440_5$-$440_8$, FIG. 4), each optically coupled to a corresponding one of the four optical outputs.

In some embodiments of any of the above apparatus, the apparatus further comprises an optical coupler (e.g., 410, FIGS. 4, 5A-5D) having first and second input ports and first and second output ports connected to receive light from the first and second input ports thereof; and wherein the first output port of the optical coupler is connected to apply the light (e.g., $420_1$, FIGS. 4, 5A-5D) to the optical input of the first waveguide circuit.

In some embodiments of any of the above apparatus, the apparatus further comprises a second waveguide circuit (e.g., $200_2$, FIG. 4), the second waveguide circuit being a nominal copy of the first waveguide circuit; and wherein the second output port of the optical coupler is connected to apply light (e.g., $420_2$, FIGS. 4, 5A-5D) to an optical input of the second waveguide circuit.

In some embodiments of any of the above apparatus, the optical coupler, the first waveguide circuit, and the second waveguide circuit are parts of a dual-polarization optical receiver; wherein the first input port of the optical coupler is configured to receive an optical communication signal (e.g., 402, FIG. 4); and wherein the second input port of the optical coupler is configured to receive an optical local-oscillator signal (e.g., 406, FIG. 4).

In some embodiments of any of the above apparatus, the optical coupler is configured to cause: the first polarization component at the optical input of the first waveguide circuit to be populated by light of a first (e.g., TE or TM) polarization component of the optical communication signal; the second polarization component at the optical input of the first waveguide circuit to be populated by light of a first (e.g., TE or TM) polarization component of the optical local-oscillator signal; a first polarization component at the optical input of the second waveguide circuit to be populated by light of a different second (e.g., TM or TE) polarization component of the optical communication signal; and a second polarization component at the optical input of the second waveguide circuit to be populated by light of a different second (e.g., TM or TE) polarization component of the optical local-oscillator signal.

In some embodiments of any of the above apparatus, the optical coupler (e.g., 410, FIG. 4) is further configured to cause: the first and second polarization components at the optical input of the first waveguide circuit to be populated by light of a transverse electric mode of the optical communication signal and light of a transverse magnetic waveguide mode of the optical local-oscillator signal, respectively; and the first and second polarization components at the optical input of the second waveguide circuit to be populated by light of a transverse magnetic mode of the optical communication signal and light of a transverse electric waveguide mode of the optical local-oscillator signal, respectively.

In some embodiments of any of the above apparatus, the optical coupler (e.g., 410, FIG. 5A or 5D) is further configured to cause: the first and second polarization components at the optical input of the first waveguide circuit to be populated by light of a transverse electric mode of the optical communication signal and light of a transverse magnetic waveguide mode of the optical local-oscillator signal, respectively; and the first and second polarization components at the optical input of the second waveguide circuit to be populated by light of a transverse magnetic mode of the optical communication signal and light of the transverse magnetic waveguide mode of the optical local-oscillator signal, respectively.

In some embodiments of any of the above apparatus, the optical coupler (e.g., 410, FIG. 5A, 5B, or 5C) is further configured to cause: the first and second polarization components at the optical input of the first waveguide circuit to be populated by light of a transverse electric mode of the optical communication signal and light of a transverse electric waveguide mode of the optical local-oscillator signal, respectively; and the first and second polarization components at the optical input of the second waveguide circuit to be populated by light of a transverse magnetic mode of the optical communication signal and light of the transverse electric waveguide mode of the optical local-oscillator signal, respectively.

In some embodiments of any of the above apparatus, the second waveguide circuit is disposed along the planar surface of the substrate.

While this disclosure includes references to illustrative embodiments, this specification is not intended to be construed in a limiting sense.

For example, although various embodiments are described in reference to waveguide circuits, such as circuits 100 and 200, the invention is not so limited. In some alternative embodiments, functionally equivalent optical devices that can be implemented using a set of appropriate optical components that includes but is not necessarily limited to waveguide circuits and/or planar lightwave circuits, can similarly be used to make and use the corresponding apparatus.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

What is claimed is:

1. An apparatus comprising:
   a substrate having a surface; and
   an optical device being located along the surface and having an optical waveguide between a single optical input and four optical outputs, the optical waveguide connecting the single optical input to an optical splitter, each of the optical outputs being connected to receive a different respective combination of light from the optical waveguide via a corresponding optical path from the optical splitter; and
   wherein, at each of the optical outputs, the different respective combination is a mixture of a first polarization component of the light from the optical waveguide and a different respective relative phase of a second polarization component of the light from the optical waveguide, the first and second polarization components being relatively orthogonal.

2. The apparatus of claim 1, wherein the four different respective combinations are mixtures of the light of the first and second polarization components with relative phases of 0±5 degrees, 90±5 degrees, 180±5 degrees, and 270±5 degrees, respectively.

3. The apparatus of claim 1, wherein the first and second polarization components are transverse electric and transverse magnetic waveguide modes, respectively, of the light from the optical waveguide.

4. The apparatus of claim 3, wherein each of the four different respective combinations is coupled into a transverse electric waveguide mode of a respective waveguide connected to a respective one of the four optical outputs.

5. The apparatus of claim 4, wherein the optical device is configured to cause transverse magnetic waveguide modes of the respective waveguides to receive substantially no light from the single optical input.

6. The apparatus of claim 1, further comprising a coherent optical receiver that includes an optical local-oscillator source and the optical device; and
   wherein the coherent optical receiver is configured to cause the first polarization component to be an optical communication signal received by the coherent optical receiver, and the second polarization component to be an optical local-oscillator signal generated by the optical local-oscillator source.

7. The apparatus of claim 6, wherein the optical local-oscillator source comprises a laser configured to generate the optical local-oscillator signal.

8. The apparatus of claim 6, wherein the optical receiver comprises an optical coupler configured to cause the first and second polarization components to be transverse electric and transverse magnetic waveguide modes, respectively.

9. The apparatus of claim 6, wherein the optical receiver comprises an optical coupler configured to cause the first and second polarization components to be transverse magnetic and transverse electric waveguide modes, respectively.

10. The apparatus of claim 1,
    wherein the optical splitter is a power splitter connected to split an input signal received through the single optical input into first and second signal portions; and
    wherein the optical device comprises:
      a polarization-sensitive phase shifter configured to introduce a relative phase shift between transverse electric and transverse magnetic waveguide modes of the second signal portion to generate a corresponding optical signal;
      a first polarization mixer configured to generate first and second relative-phase combinations of the four different respective combinations, an electric-field strength of the first relative-phase combination being proportional to a sum of electric-field strengths of transverse electric and transverse magnetic waveguide modes of the first signal portion, and an electric-field strength of the second relative-phase combination being proportional to a difference of the electric-field strengths of the transverse electric and transverse magnetic waveguide modes of the first signal portion; and
      a second polarization mixer configured to generate third and fourth relative-phase combinations of the four different respective combinations, an electric-field strength of the third relative-phase combination being proportional to a sum of electric-field strengths of transverse electric and transverse magnetic waveguide modes of the corresponding optical signal, and an electric-field strength of the fourth relative-phase combination being proportional to a difference of the electric-field strengths of the transverse electric and transverse magnetic waveguide modes of the corresponding optical signal.

11. The apparatus of claim 10, wherein each of respective optical signals having the first, second, third, and fourth relative-phase combinations is coupled into a transverse electric waveguide mode of a respective waveguide connected to a respective one of the four optical outputs.

12. The apparatus of claim 11, wherein the optical device is configured to cause transverse magnetic waveguide modes of the respective waveguides to receive substantially no light from the single optical input.

13. The apparatus of claim 1, further comprising an array of photodetectors, each optically coupled to a corresponding one of the four optical outputs.

14. The apparatus of claim 1, further comprising an optical coupler having first and second input ports and first and second output ports connected to receive light from the first and second input ports thereof; and
wherein the first output port of the optical coupler is connected to apply the light to the single optical input of the optical device.

15. The apparatus of claim 14, further comprising another optical device having another optical waveguide between an optical input and four optical outputs of said another optical device, each of the optical outputs of said another optical device being connected to receive a different respective combination of light from said another optical waveguide via different optical paths of said another optical device; and
wherein the second output port of the optical coupler is connected to apply light to the optical input of said another optical device.

16. The apparatus of claim 15, further comprising a dual-polarization optical receiver that includes the optical coupler, the optical device, and said another optical device;
wherein the first input port of the optical coupler is configured to receive an optical communication signal; and
wherein the second input port of the optical coupler is configured to receive an optical local-oscillator signal.

17. The apparatus of claim 16, wherein the optical coupler is configured to cause:
the first polarization component at the single optical input of the optical device to have light of a first polarization component of the optical communication signal;
the second polarization component at the single optical input of the optical device to have light of a first polarization component of the optical local-oscillator signal;
a first polarization component at the optical input of said another optical device to have light of a different second polarization component of the optical communication signal; and
a second polarization component at the optical input of said another optical device to have light of a different second polarization component of the optical local-oscillator signal.

18. The apparatus of claim 17, wherein the optical coupler is further configured to cause:
the first and second polarization components at the single optical input of the optical device to have light of a transverse electric waveguide mode of the optical communication signal and light of a transverse magnetic waveguide mode of the optical local-oscillator signal, respectively; and
the first and second polarization components at the optical input of said another optical device to have light of a transverse magnetic waveguide mode of the optical communication signal and light of a transverse electric waveguide mode of the optical local-oscillator signal, respectively.

19. The apparatus of claim 17, wherein the optical coupler is further configured to cause:
the first and second polarization components at the single optical input of the optical device to have light of a transverse electric waveguide mode of the optical communication signal and light of a transverse magnetic waveguide mode of the optical local-oscillator signal, respectively; and
the first and second polarization components at the optical input of said another optical device to have light of a transverse magnetic mode of the optical communication signal and light of the transverse magnetic waveguide mode of the optical local-oscillator signal, respectively.

20. The apparatus of claim 17, wherein the optical coupler is further configured to cause:
the first and second polarization components at the single optical input of the optical device to have light of a transverse electric waveguide mode of the optical communication signal and light of a transverse electric waveguide mode of the optical local-oscillator signal, respectively; and
the first and second polarization components at the optical input of said another optical device to have light of a transverse magnetic mode of the optical communication signal and light of the transverse electric waveguide mode of the optical local-oscillator signal, respectively.

21. An apparatus comprising:
a substrate having a surface; and
an optical device being located along the surface and having an optical input and four optical outputs, each of the optical outputs being connected to receive a different respective combination of light from the optical input via different optical paths of the optical device; and
wherein, at each of the optical outputs, the different respective combination is a mixture of a first polarization component of the light from the optical input and a different respective relative phase of a second polarization component of the light from the optical input, the first and second polarization components being relatively orthogonal; and
wherein the optical device comprises:
a power splitter connected to split an input signal received through the optical input into first and second signal portions;
a polarization-sensitive phase shifter configured to introduce a relative phase shift between transverse electric and transverse magnetic waveguide modes of the second signal portion to generate a corresponding optical signal;
a first polarization mixer configured to generate first and second relative-phase combinations of the four different respective combinations, an electric-field strength of the first relative-phase combination being proportional to a sum of electric-field strengths of transverse electric and transverse magnetic waveguide modes of the first signal portion, and an electric-field strength of the second relative-phase combination being proportional to a difference of the electric-field strengths of the transverse electric and transverse magnetic waveguide modes of the first signal portion; and a second polarization mixer configured to generate third and fourth relative-phase combinations of the four different respective combinations, an electric-field strength of the third relative-phase combination being proportional to a sum of electric-field strengths of transverse electric and transverse magnetic waveguide modes of the corresponding optical signal, and an electric-field strength of the fourth relative-phase combination being proportional to a difference of the electric-field strengths of the transverse electric and transverse magnetic waveguide modes of the corresponding optical signal.

22. The apparatus of claim 21, wherein each of respective optical signals having the first, second, third, and fourth relative-phase combinations is coupled into a transverse electric waveguide mode of a respective waveguide connected to a respective one of the four optical outputs.

23. The apparatus of claim 22, wherein the optical device is configured to cause transverse magnetic waveguide modes of the respective waveguides to receive substantially no light from the optical input.

* * * * *